US012693831B2

(12) United States Patent
Varma et al.

(10) Patent No.:  US 12,693,831 B2
(45) Date of Patent:    Jul. 28, 2026

(54) MANAGING FEATURE EVOLUTION

(71) Applicant: Dell Products L.P., Round Rock, TX (US)

(72) Inventors: Mithun Varma, Bangalore (IN); Suhas Bk, Bangalore (IN); Jiwan Sah, Dombivali (IN)

(73) Assignee: Dell Products L.P., Round Rock, TX (US)

( * ) Notice: Subject to any disclaimer, the term of this patent is extended or adjusted under 35 U.S.C. 154(b) by 233 days.

(21) Appl. No.: 18/655,607

(22) Filed: May 6, 2024

(65) Prior Publication Data

US 2025/0342010 A1      Nov. 6, 2025

(51) Int. Cl.
G06F 8/20          (2018.01)

(52) U.S. Cl.
CPC ...................................... G06F 8/20 (2013.01)

(58) Field of Classification Search
CPC ........................................................ G06F 8/20
See application file for complete search history.

(56) References Cited

U.S. PATENT DOCUMENTS

| | | | |
|---|---|---|---|
| 7,337,124 B2 * | 2/2008 | Corral .............. | G06Q 10/06314 705/7.17 |
| 11,366,958 B1 | 6/2022 | Tay et al. | |

| | | | |
|---|---|---|---|
| 2002/0099580 A1 * | 7/2002 | Eicher, Jr. .......... | G06Q 30/0607 705/26.25 |
| 2008/0046484 A1 * | 2/2008 | Ellis ............... | G06Q 10/063114 |
| 2011/0271249 A1 * | 11/2011 | Wang ....................... | H04L 67/10 709/227 |
| 2016/0274867 A1 * | 9/2016 | Narayanan ................ | G06F 8/38 |
| 2018/0150380 A1 * | 5/2018 | Darbha ............... | G06F 11/3604 |
| 2020/0110596 A1 * | 4/2020 | Niininen ................... | G06F 8/70 |
| 2021/0090556 A1 * | 3/2021 | Quemy ............ | G06Q 10/06315 |
| 2021/0334729 A1 | 10/2021 | Watt, Jr. et al. | |
| 2022/0270609 A1 | 8/2022 | Kathpalia et al. | |
| 2024/0281248 A1 * | 8/2024 | Shah ......................... | G06F 8/77 |
| 2024/0362017 A1 | 10/2024 | Parhi et al. | |

* cited by examiner

*Primary Examiner* — Vance M Little
(74) *Attorney, Agent, or Firm* — BainwoodHuang

(57) ABSTRACT

Techniques are directed to managing feature evolution. Such techniques involve receiving closure commands to close issue tracking entries in an issue tracking tool constructed and arranged to track issues for a feature. Such techniques further involve, in response to the closure commands, applying design change tags and timestamps to the issue tracking entries in the issue tracking tool. The design change tags indicate whether the issue tracking entries identify design changes in the feature. Additionally, the timestamps indicate when the design change tags are applied to the issue tracking entries Such techniques further involve storing, in a repository, the design change tags and the timestamps applied to the issue tracking entries to enable construction of a feature evolution chronology from the design change tags and the timestamps.

19 Claims, 9 Drawing Sheets

100

102

User
Device
102(1)

User
Device
102(2)

. . .

106

122

120

Other Equipment 108
(e.g., Test Platform)

124

Feature Management Platform 104
Constructed and Arranged to
Manage Software Feature Evolution
(e.g., Specialized Circutiry, Code Development Tool,
Issue Tracking Tool, Documentation Tool, etc.)

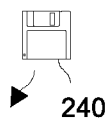
240
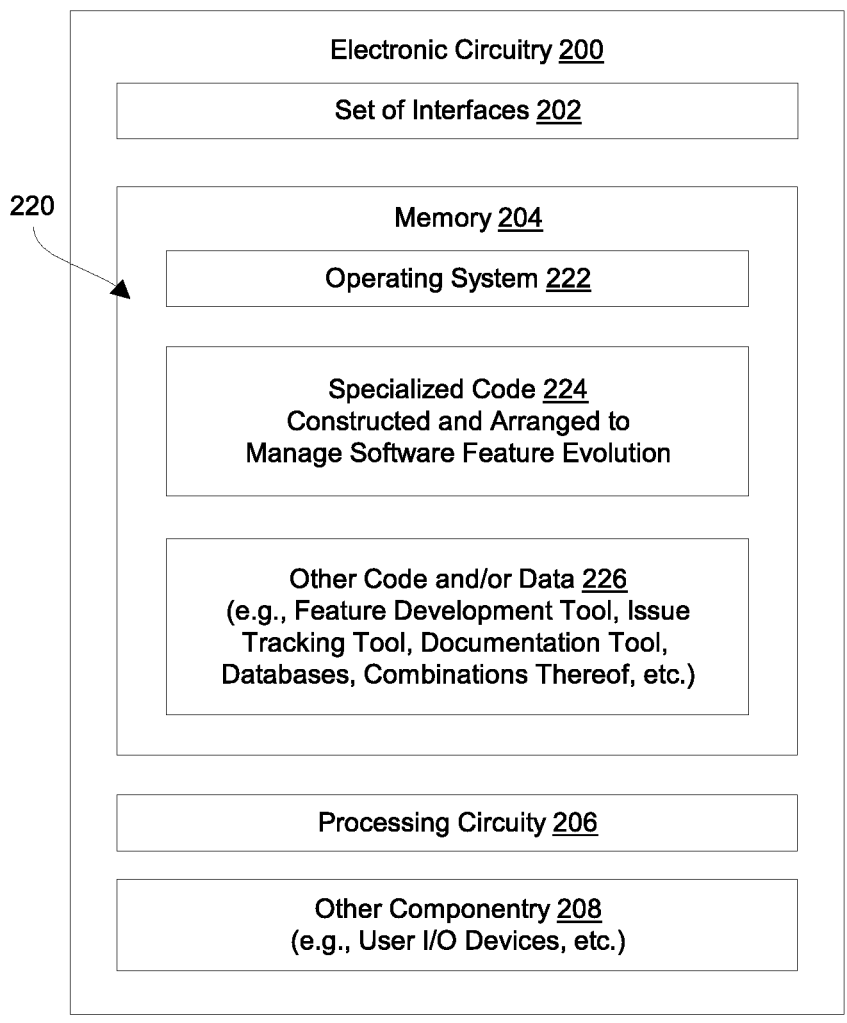
220
FIG. 2

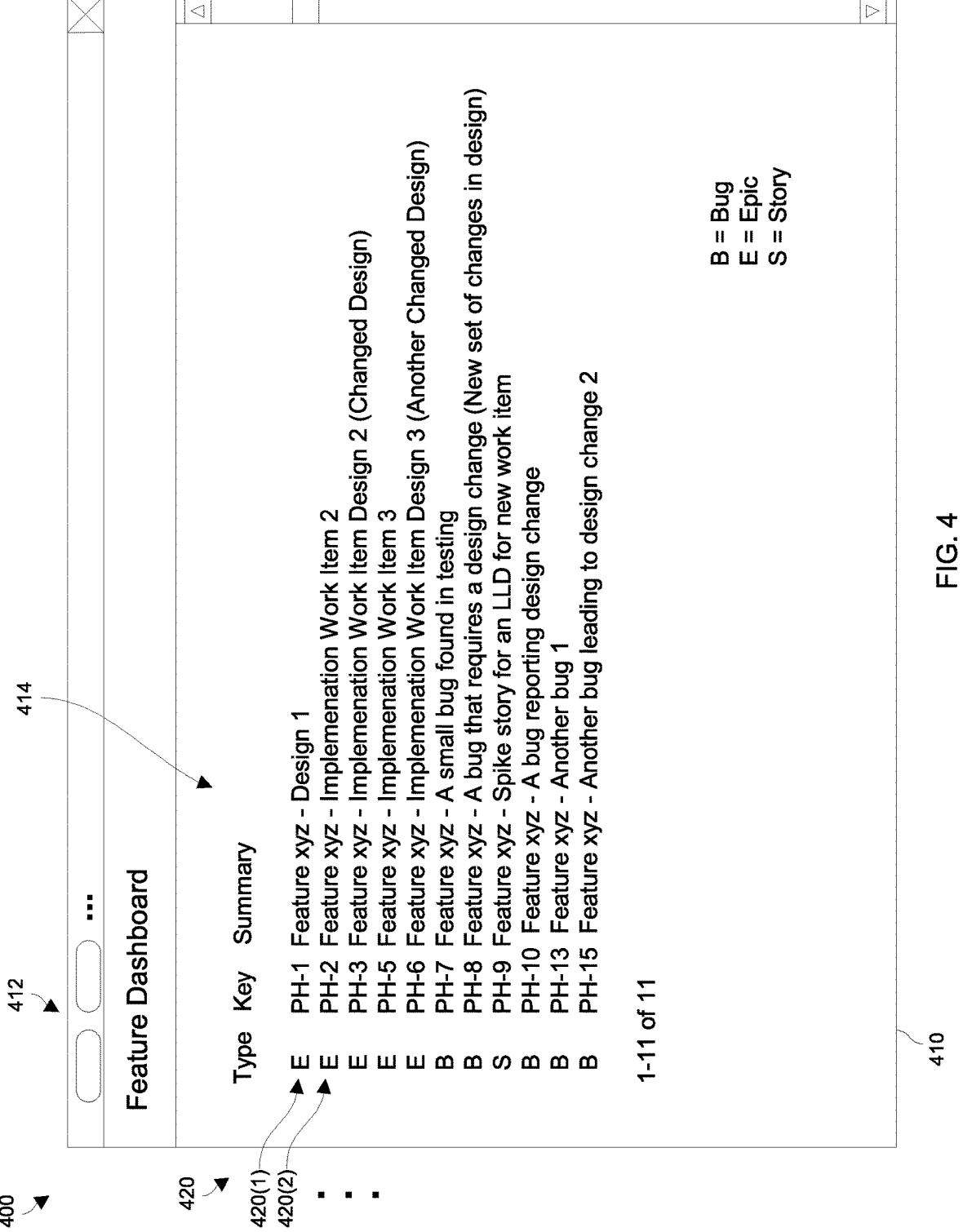

Feature Dashboard

| Type | Key | Summary |
|------|------|---------|
| E | PH-1 | Feature xyz - Design 1 |
| E | PH-2 | Feature xyz - Implemenation Work Item 2 |
| E | PH-3 | Feature xyz - Implemenation Work Item Design 2 (Changed Design) |
| E | PH-5 | Feature xyz - Implemenation Work Item 3 |
| E | PH-6 | Feature xyz - Implemenation Work Item Design 3 (Another Changed Design) |
| B | PH-7 | Feature xyz - A small bug found in testing |
| B | PH-8 | Feature xyz - A bug that requires a design change (New set of changes in design) |
| S | PH-9 | Feature xyz - Spike story for an LLD for new work item |
| B | PH-10 | Feature xyz - A bug reporting design change |
| B | PH-13 | Feature xyz - Another bug 1 |
| B | PH-15 | Feature xyz - Another bug leading to design change 2 |

1-11 of 11

B = Bug
E = Epic
S = Story

FIG. 4

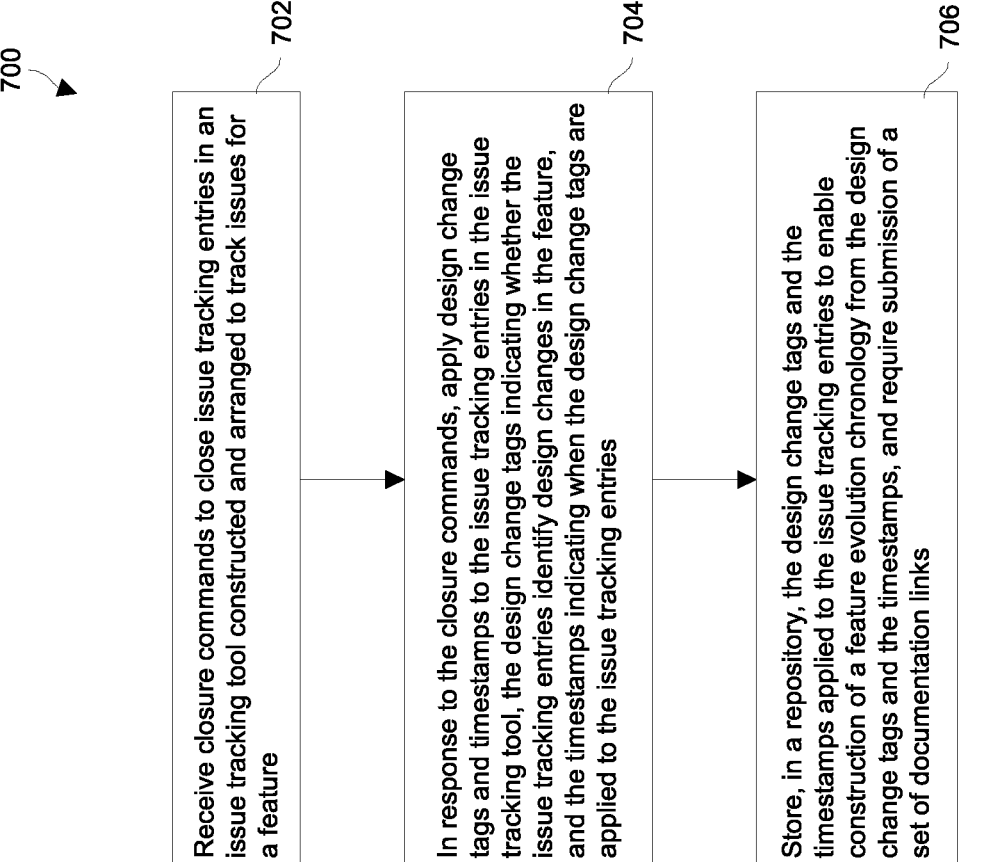

700

Receive closure commands to close issue tracking entries in an issue tracking tool constructed and arranged to track issues for a feature

702

In response to the closure commands, apply design change tags and timestamps to the issue tracking entries in the issue tracking tool, the design change tags indicating whether the issue tracking entries identify design changes in the feature, and the timestamps indicating when the design change tags are applied to the issue tracking entries

704

Store, in a repository, the design change tags and the timestamps applied to the issue tracking entries to enable construction of a feature evolution chronology from the design change tags and the timestamps, and require submission of a set of documentation links

MANAGING FEATURE EVOLUTION

BACKGROUND

Software developers may frequently communicate with each other when working together on a software project. For example, software developers may share ideas, approaches, design requirements, progress, and so on.

A conventional collaboration tool allows software developers to electronically collaborate/share project information. Along these lines, such a tool enables the software developers act as a team by sharing their thoughts, comments, suggestions, status, updates, and so on.

SUMMARY

It should be understood that there are deficiencies to the above-described conventional collaboration tool that allows developers to electronically share project information. Along these lines, the proliferation of documents during the software project may make finding critical documents later on difficult and perhaps even impractical.

For example, suppose that a software developer later performs a keyword search to identify details regarding a certain bug fix. Some resulting documents may be particularly relevant while other resulting documents may be non-relevant or off the mark, superfluous, address uninteresting directions that were not pursued, etc. Additionally, some resulting documents may pertain to the initial identification of the bug, but not to the sought after solution details, and so on.

Unfortunately, the burden of navigating/reading/digging through the search results slows down the searching process, may require significant effort, and does not guarantee that such searching will even correctly find documents that are on point. Moreover, the anticipated burden of going through the resulting documents and low expectations of finding meaningful documents may deter the software developer from even attempting the search.

Improved techniques are directed to managing feature evolution using design change tags (or flags) that may be applied to issue tracking entries in a feature tracking tool. Such tags (e.g., markers indicating that the issue tracking entries identify design changes) may be applied at the time of issue closure (e.g., the time of completion of the design changes) and may be applied along with timestamps to indicate the times of issue closure and links to the most pertinent documentation (e.g., documentation that was identified as being the most relevant at the time of issue closure). Moreover, such techniques enable construction of a feature evolution chronology (e.g., a design change timeline) to enable a user to easily identify particular design changes that have been completed for a feature. In some arrangements, the feature evolution chronology lists only issue tracking entries that identify design changes (e.g., omitting other entries that do not identify design changes), and the issue tracking entries are sorted (or ranked) based on time of issue closure. In some arrangements which display chronology information, the links are adjacent to the issue tracking entries and automatically provide access to the pertinent documentation within a documentation tool to enable the user to quickly and easily navigate to that documentation. Accordingly, the user is able to effectively access pertinent documentation without needing to perform keyword searches and read through the results of the keyword searches.

One embodiment is directed to a method of managing feature evolution. The method includes receiving closure commands to close issue tracking entries in an issue tracking tool constructed and arranged to track issues for a feature. The method further includes, in response to the closure commands, applying design change tags and timestamps to the issue tracking entries in the issue tracking tool. The design change tags indicate whether the issue tracking entries identify design changes in the feature. Additionally, the timestamps indicate when the design change tags are applied to the issue tracking entries. The method further includes storing, in a repository, the design change tags and the timestamps applied to the issue tracking entries to enable construction of a feature evolution chronology from the design change tags and the timestamps.

Another embodiment is directed to electronic equipment which includes memory, and control circuitry coupled to the memory. The memory stores instructions which, when carried out by the control circuitry, cause the control circuitry to perform a method of:

(A) receiving closure commands to close issue tracking entries in an issue tracking tool constructed and arranged to track issues for a feature, (B) in response to the closure commands, applying design change tags and timestamps to the issue tracking entries in the issue tracking tool, the design change tags indicating whether the issue tracking entries identify design changes in the feature, and the timestamps indicating when the design change tags are applied to the issue tracking entries, and (C) storing, in a repository, the design change tags and the timestamps applied to the issue tracking entries to enable construction of a feature evolution chronology from the design change tags and the timestamps.

Yet another embodiment is directed to a computer program product having a non-transitory computer readable medium which stores a set of instructions to manage software feature evolution. The set of instructions, when carried out by computerized circuitry, causes the computerized circuitry to perform a method of:

(A) receiving closure commands to close issue tracking entries in an issue tracking tool constructed and arranged to track issues for a software feature;

(B) in response to the closure commands, applying design change tags and timestamps to the issue tracking entries in the issue tracking tool, the design change tags indicating whether the issue tracking entries identify design changes in the software feature, and the timestamps indicating when the design change tags are applied to the issue tracking entries; and (C) storing, in a repository, the design change tags and the timestamps applied to the issue tracking entries to enable construction of a software feature evolution chronology from the design change tags and the timestamps.

In some arrangements, the method further includes receiving a chronology generation request and, in response to the chronology generation request, accessing the repository to generate the feature evolution chronology based on the design change tags and the timestamps applied to the issue tracking entries.

In some arrangements, the issue tracking entries include design change entries and other entries. Additionally, the design change tags applied to the issue tracking entries indicate that the design change entries identify design changes in the feature and that the other entries do not identify design changes in the feature. Furthermore, the method further includes, based on the design change tags, rendering a timeline which includes descriptions from the design change entries and omits descriptions from the other entries.

In some arrangements, the timestamps applied to the issue tracking entries in the issue tracking tool are closure times that identify when the issues for the feature were closed. Additionally, rendering the timeline on the electronic monitor includes displaying the descriptions from the design change entries in chronological order based on the closure times that identify when the issues for the feature were closed.

In some arrangements, the issue tracking entries include design change entries and other entries. Additionally, the design change tags applied to the issue tracking entries indicate that the design change entries identify design changes in the feature and that the other entries do not identify design changes in the feature. Furthermore, the method further includes connecting the design change entries to documentation describing design changes in the feature.

In some arrangements, connecting the design change entries to the documentation includes receiving links to the documentation. Additionally, the method further includes storing, in the repository along with the design change tags and the timestamps applied to the issue tracking entries, the links to the documentation.

In some arrangements, the method further includes displaying descriptions of certain design changes identified by certain design change entries and links to certain documentation describing the certain design changes.

In some arrangements, the documentation resides within a documentation tool. Additionally, the method further includes, in response to activating a link to particular documentation, providing access to the particular documentation via the documentation tool.

In some arrangements, receiving the links to the documentation includes:

(i) detecting a broken link that does not identify documentation, (ii) outputting an alert indicating that the broken link does not identify documentation, and (iii) prompting, in place of the broken link, for input of a proper link that identifies documentation.

It should be understood that, in the cloud context, at least some of the electronic circuitry disclosed herein is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in managing feature evolution.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 2 is a block diagram of electronic equipment which manages feature evolution in accordance with certain embodiments.

FIG. 4 is a view of a feature dashboard in accordance with certain embodiments.

FIG. 7 is a flowchart of a procedure which is performed while managing feature evolution in accordance with certain embodiments.

DETAILED DESCRIPTION

An improved technique is directed to managing evolution of a software feature using design change tags that may be applied to issue tracking entries in a feature tracking tool. Such tags (e.g., fields holding values indicating whether the issue entries identify design changes) may be applied at the time of issue closure (e.g., the time of completion of the design changes) and may be applied along with timestamps and links to the most pertinent documentation (e.g., documentation that was identified as being the most relevant at the time of issue closure). Such a technique enables construction of a feature evolution chronology (e.g., a design change timeline) to enable a user to easily identify particular design changes that have been completed for the software feature. In some arrangements, the feature evolution chronology includes only issue tracking entries that identify design changes (e.g., omitting other entries that do not identify design changes), and the entries are sorted (or ranked) based on time of issue closure. The links may be shown adjacent to the entries and, when activated or launched, automatically provide access to the pertinent documentation within a documentation tool to enable the user to quickly and easily navigate to that documentation. As a result, the user is able to effectively access pertinent documentation for one or more particular design changes without needing to perform keyword searches and read through the results of the keyword searches.

Figure 1:
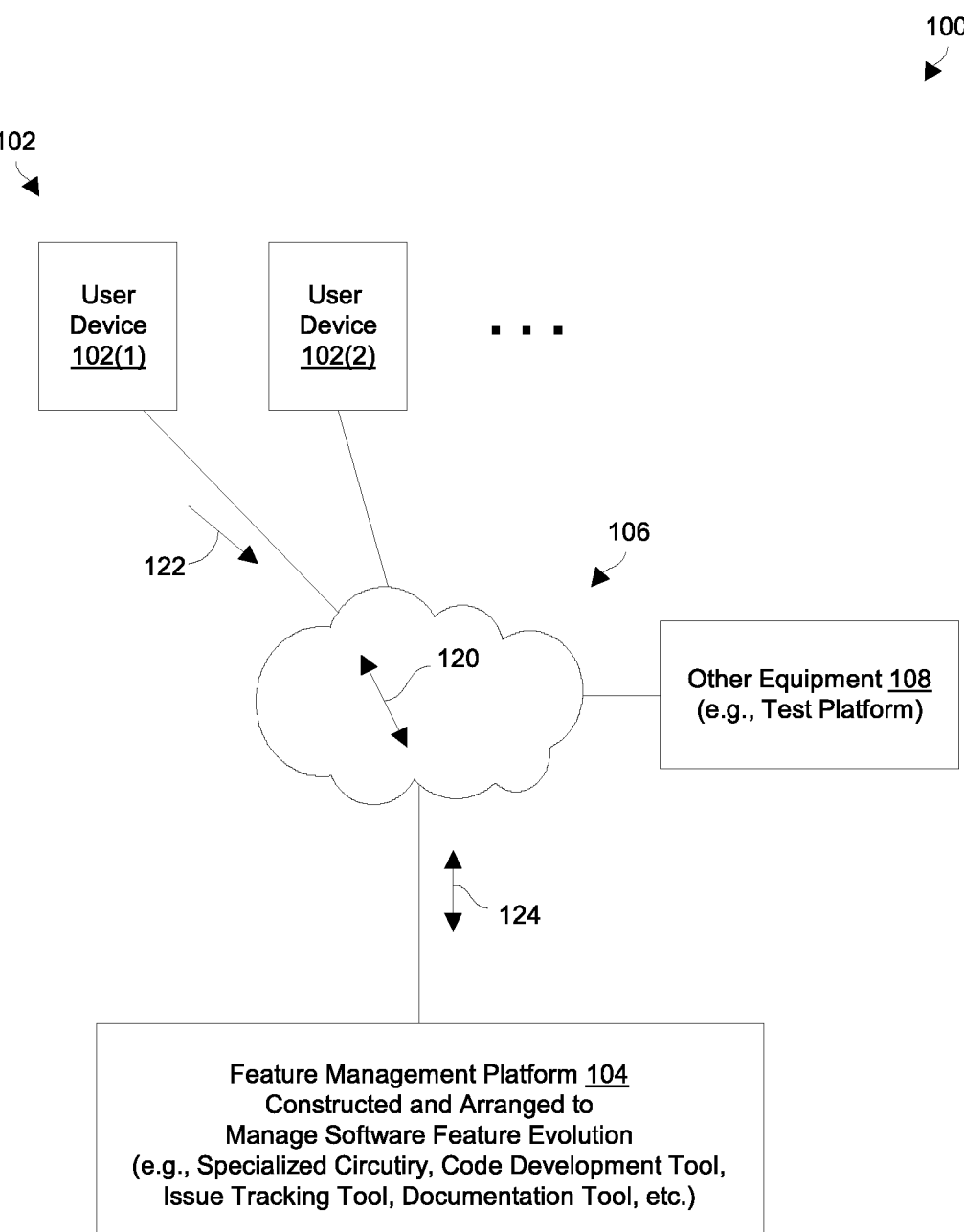
FIG. 1 is a block diagram of an environment which manages feature evolution in accordance with certain embodiments.

FIG. 1 shows an environment 100 which manages feature evolution in accordance with certain embodiments. The environment 100 includes user devices 102(1), 102(2), . . . (collectively, user devices 102), a feature management platform 104, and a communications medium 106. The environment 100 may further include other equipment 108 such as test platforms on which to test software features, field equipment on which to deploy features, and so on.

The user devices 102 are constructed and arranged to perform useful work on behalf of respective users. Suitable equipment for the user devices 102 include desktop computers, laptops, workstations, and the like. Such equipment enables the users to effectively and collaboratively create, develop, test, debug, and control software features within the environment 100.

The feature management platform 104 is constructed and arranged to provide various resources (e.g., templates, editors, frameworks for applying/utilizing Agile methodologies, and other tools) to the user devices 102 which enable the respective users to richly and robustly work on software features. To this end, the feature management platform 104 may be provisioned with various tools such as a code development tool, an issue tracking tool, a documentation tool, etc. Example code development tools include Github, Gitlab, Bitbucket, and the like. Example issue tracking tools include Bugzilla, Jira, Mantis, and the like. Example documentation tools include Document360, Nuclino, Confluence, and the like. These are just some tools to name a few, and other tools are suitable for use as well.

As will be explained in further detail shortly, the feature management platform 104 is further constructed and arrange to manage software feature evolution. Along these lines, the feature management platform 104 includes specialized circuitry which is constructed and arranged to apply design change tags to issue tracking entries of an issue tracking tool (e.g., at the time of issue closure or completion of associated design changes) record issue closure timestamps, and attach links to the most pertinent documentation. Accordingly, such information is later available to construct a feature evolution chronology (e.g., a design change timeline) to enable a user to subsequently identify (or find) documentation regarding particular design changes that have been completed for the software feature. Using the feature evolution chronology, the user is able to quickly and easily access pertinent documentation for one or more particular design changes without needing to perform keyword searches and read through vast results of the keyword searches, etc.

The communications medium 106 is constructed and arranged to connect the various components of the environment 100 together to enable these components to exchange electronic signals 120 (e.g., see the double arrow 120) and thus communicate with each other. The communications medium 106 is illustrated as a cloud to indicate that the communications medium 106 is capable of having a variety of different topologies including backbone, hub-and-spoke, loop, irregular, combinations thereof, and so on. Along these lines, the communications medium 106 may include copper-based data communications devices and cabling, fiber optic devices and cabling, wireless devices, combinations thereof, etc. Furthermore, the communications medium 106 is capable of supporting LAN-based communications, SAN-based communications, cellular communications, combinations thereof, etc.

Along these lines, the communications medium 106 conveys input 122 (e.g., commands, data, collaboration input, etc.) from the user devices 102 to the feature management platform 104 enabling the user devices 102 to access the various resources of the feature management platform 104 (illustrated by the arrow 124). Such operation enables the users operating the user devices 102 to perform useful work.

The other equipment 108 represents additional apparatus which may be available within the environment 100. For example, the other equipment 108 may include one or more test platforms constructed and arranged to perform certain operations such as debugging and/or testing software features. Such operations may include running test procedures that exercise software features which have been managed, developed, updated/enhanced, etc. by the feature management platform 104. Furthermore, the other equipment 108 may simulate various devices (e.g., host devices, equipment in the field, malicious devices, processors, storage devices, communications interfaces, etc.) to enable rich and reliable software feature testing. Further details will now be provided with reference to FIG. 2.

FIG. 2 shows electronic circuitry (or equipment) 200 which manages feature evolution in accordance with certain embodiments. The electronic circuitry 200 includes a set of interfaces 202, memory 204, processing circuitry 206, and other componentry (or circuitry) 208.

The set of interfaces 202 is constructed and arranged to connect the electronic circuitry 200 to the communications medium 106 (FIG. 1) to enable communications with other devices of the environment 100. Such communications may be IP-based, SAN-based, cellular-based, cable-based, fiber-optic based, wireless, cloud-based, combinations thereof, and so on. Accordingly, the set of interfaces 202 may include one or more host interfaces (e.g., a computer network interface, a fibre-channel interface, etc.), one or more storage device interfaces (e.g., a host adapter or HBA, etc.), and other interfaces. As a result, the set of interfaces 202 enables the electronic circuitry 200 to robustly and reliably communicate with various apparatus.

The memory 204 is intended to represent both volatile storage (e.g., DRAM, SRAM, etc.) and non-volatile storage (e.g., solid state memory, magnetic memory, etc.). The memory 204 stores a variety of software constructs 220 including an operating system 222, specialized code 224, and other code and data 226. The operating system 222 refers to particular control code such as a kernel to manage computerized resources (e.g., processor cycles, memory space, etc.), the I/O stack (e.g., drivers), and so on. The specialized code 224 refers to particular instructions and/or other software constructs for, among other things, managing feature evolution. The other code and data 226 refers to applications/code/templates/etc. for various applications and tools, databases, settings, thresholds, configuration information, combinations thereof, and so on.

The processing circuitry 206 is constructed and arranged to operate in accordance with the various software constructs 220 stored in the memory 204. Along these lines, the processing circuitry 206 may execute the specialized code 224 to form specialized circuitry that robustly and reliably enables the electronic circuitry 200 to perform various operations such as managing feature evolution, creating and debugging software features, and so on. Such processing circuitry 206 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 240 is capable of delivering all or portions of the software constructs 220 to the electronic circuitry 200. In particular, the computer program product 240 has a non-transitory (or non-volatile) computer readable medium which stores a set of instructions that controls one or more operations of the electronic circuitry 200. Examples of suitable computer readable storage media include tangible articles of manufacture and apparatus which store instructions in a non-volatile manner such as DVD, CD-ROM, flash memory, disk memory, tape memory, and the like.

The other componentry 208 refers to other hardware of the electronic circuitry 200. Along these lines, the electronic circuitry 200 may further include specialized equipment such as a local user input/output (I/O) circuitry, circuitry for fault tolerance, etc. Further details will now be provided with reference to FIG. 3.

Figure 3:
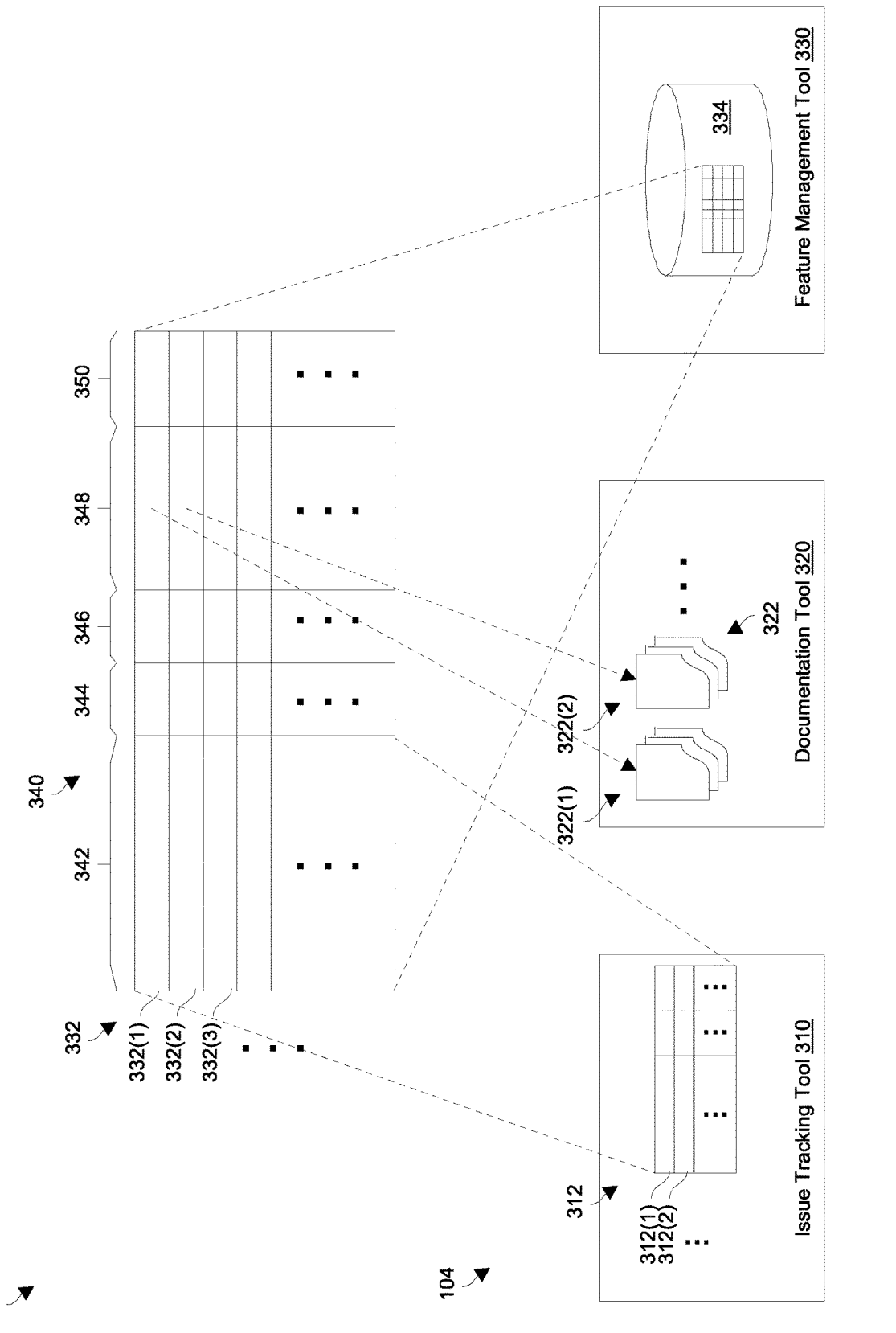
FIG. 3 is a block diagram illustrating particular details involved in managing feature evolution in accordance with certain embodiments.

FIG. 3 shows a view 300 of certain details of the feature management platform 104 (also see FIG. 1). In particular, the feature management platform 104 includes an issue tracking tool 310 having issue tracking entries 312(1), 312(2), . . . (collectively, issue tracking entries 312), a documentation tool 320 having documents 322, and a feature management tool 330 which manages feature management entries 332(1), 332(2), 332(3), . . . (collectively, feature management entries 332).

As mentioned above in connection with FIG. 2, the various components of the feature management platform 104 may be formed by specialized circuitry (e.g., processing circuitry running in accordance with specialized code). In some arrangements, the feature management platform 104 includes additional resources such as programming tools (e.g., language sensitive editors, code integration tools, compilers, debuggers, etc.), libraries, and so on.

The issue tracking tool 310 is constructed and arranged to perform a variety of software feature issue tracking operations such as project planning and management, issue/task distribution and tracking among users, monitoring work and status involving coding/testing/debugging, and the like. In some arrangements, the issue tracking tool 310 implements Agile development methodologies.

Along these lines, the issue tracking entries 312 of the issue tracking tool 310 store respective issue tracking information for feature issues (or items) that are tracked by the issue tracking tool 310. Such issues may be of different types such as epics, stories, bugs, and so on, in the context of Agile software development. Additionally, certain issue types such as epics and bugs may involve design changes (i.e., where code is create, enhanced, fixed, combinations thereof, etc.). In particular, the issue tracking entries 312 may include a variety of fields for storing issue identifiers, issue descriptions, user identifiers identifying users that are working on the issues, fields indicating status (e.g., whether the issues are new and not yet started, whether the issues are open and being worked on, whether the issues have been completed and thus closed), and so on. The issue tracking entries 312 may further include, in the form of timestamps, issue creation times, issue update times, amounts of time that users have worked on the issues, issue closure times, and so on.

The documentation tool 320 is constructed and arranged to provide, for the software features, a collaboration workspace among the users. Along these lines, the documentation tool 320 manages user input such as ideas, meeting notes, comments, recommendations, design details, solutions for fixing bugs, updates, and so on. Also, the documentation tool 320 may include a history of which users accessed the documents 322, document creation times, document update times, and so on.

Such user input is stored within the documents 322 or as document metadata, and the users are provided shared access via interfaces such as web browsers or similar graphical user interfaces (GUIs). In some arrangements, the documents 322 may be identified and/or accessed via links (e.g., filesystem paths, uniform resource locators or URLs, other types of pointers, combinations thereof, and so on).

The feature management tool 330 is constructed and arranged to enable the users to manage feature evolution of the software features. In particular, the feature management tool 330 enables the users to save certain design change details and later dynamically generate feature chronologies (or timelines) based on those design change details. The users are then able to easily and quickly find design change information from documentation via the feature chronologies.

To this end, the feature management tool 330 utilizes a feature management repository 334 of feature management entries 332. As shown in FIG. 3, the feature management entries 332 include various fields 340 such as issue tracking fields 342, design change fields 344, closure timestamp fields 346, documentation link fields 348, and perhaps other fields 350.

The issue tracking fields 342 of the feature management entries 332 are constructed and arranged to hold issue tracking information for issues tracked by the issue tracking tool 310. Such issue tracking information may include some or all of the information contained within the issue tracking entries 312 of the issue tracking tool 310 or even the issue tracking entries 312 themselves. For example, the feature management entries 332 may be enhancements (e.g., extra fields) to the issue tracking entries 312 to supplement the issue tracking entries 312 within the issue tracking tool 310 (i.e., the feature management entries 332 are the issue tracking entries 312 plus additional information or fields). As another example, the contents of the issue tracking fields 342 may include pointers to respective issue tracking entries 312 in the issue tracking tool 310. As yet another example, the contents of the issue tracking fields 342 may include copies of information from respective issue tracking entries 312 in the issue tracking tool 310, and so on.

The design change fields 344 of the feature management entries 332 are constructed and arranged to hold information indicating whether the issues tracked by the issue tracking entries 312 are design changes. In some arrangements, a design change field 344 of an issue tracking field 342 holds a design change tag (or marker) when the issue tracked by issue tracking field 342 is a design change, and does not hold a design change tag when the issue tracked by issue tracking field 342 is not a design change. Suitable values for such a design change tag include a flag (e.g., a set of bits that can be set to impose the flag/marker), a Boolean (e.g., a value that can be set to True to impose the flag/marker), or the like (e.g., other values such as "Yes", "Y", a non-zero value, and so on).

The closure timestamp fields 346 are constructed and arranged to store time information indicating when the issues tracked by the issue tracking entries 312 are closed. Such time information may be absolute time, relative amount of time from a reference time, and so on. Such time information enables the various issues that are tracked by the issue tracking entries 312 to be ordered or organized/arranged based on closure times (i.e., when the issues are closed).

In some arrangements, the feature management tool 330 leverages off of the closure timestamp information that the issue tracking tool 310 manages within the issue tracking entries 312. That is, the feature management tool 330 uses, as the closure timestamp fields 346, closure time fields of the issue tracking entries 312 since such closure time fields contain closure times indicating when the users closed the issue tracking entries 312.

The documentation link fields 348 are constructed and arranged to hold sets of links to documentation managed by the documentation tool 320. Along these lines, a link may be a filesystem path, a URL, another type of pointer, combinations thereof, and so on). For example and as shown in FIG. 3, the documentation link field 348 of the feature management entry 332(1) holds links to a first set of documents 322(1) (i.e., one or more documents 322), the documentation link field 348 of the feature management entry 332(2) holds links to a second set of documents 322(2), and so on.

In some arrangements, when the design change field 344 of a feature management entry 332 indicates that the feature management entry 332 is for a design change, the feature management platform 104 requires the documentation link field 348 of the feature management entry 332 to hold at least one documentation link to identify documentation within the documentation tool 320. Otherwise, the feature management platform 104 provides a warning message to the user who is trying to close the issue, and does not let the user close the issue.

The other fields 340 of the feature management entries 332 may hold other types of information related to the such as feature identifiers that uniquely identify features, feature descriptions, owner/user identifiers, access histories, control/status, settings, combinations thereof, etc.

As mentioned earlier, the feature management entries 332 may be extensions of the issue tracking entries 312, or alternatively separate but reference respective issue tracking entries 312. In both situations, there are fields which enhance/embellish the fields of the issue tracking entries 312. The presence of these additional fields augment the usefulness issue tracking entries 312, and provide advantages/benefits not currently available in conventional tools.

Moreover, the feature management entries 332 may be viewed as forming or residing within a feature management repository 334. Along these lines, the repository 334 may fully reside within the issue tracking tool 310. Alternatively, a portion or all of the repository 334 may reside outside the issue tracking tool 310, such as within the feature management tool 330 as shown in FIG. 3 by way of example. Further details will now be provided with reference to FIGS. 4 through 7.

Figure 5:
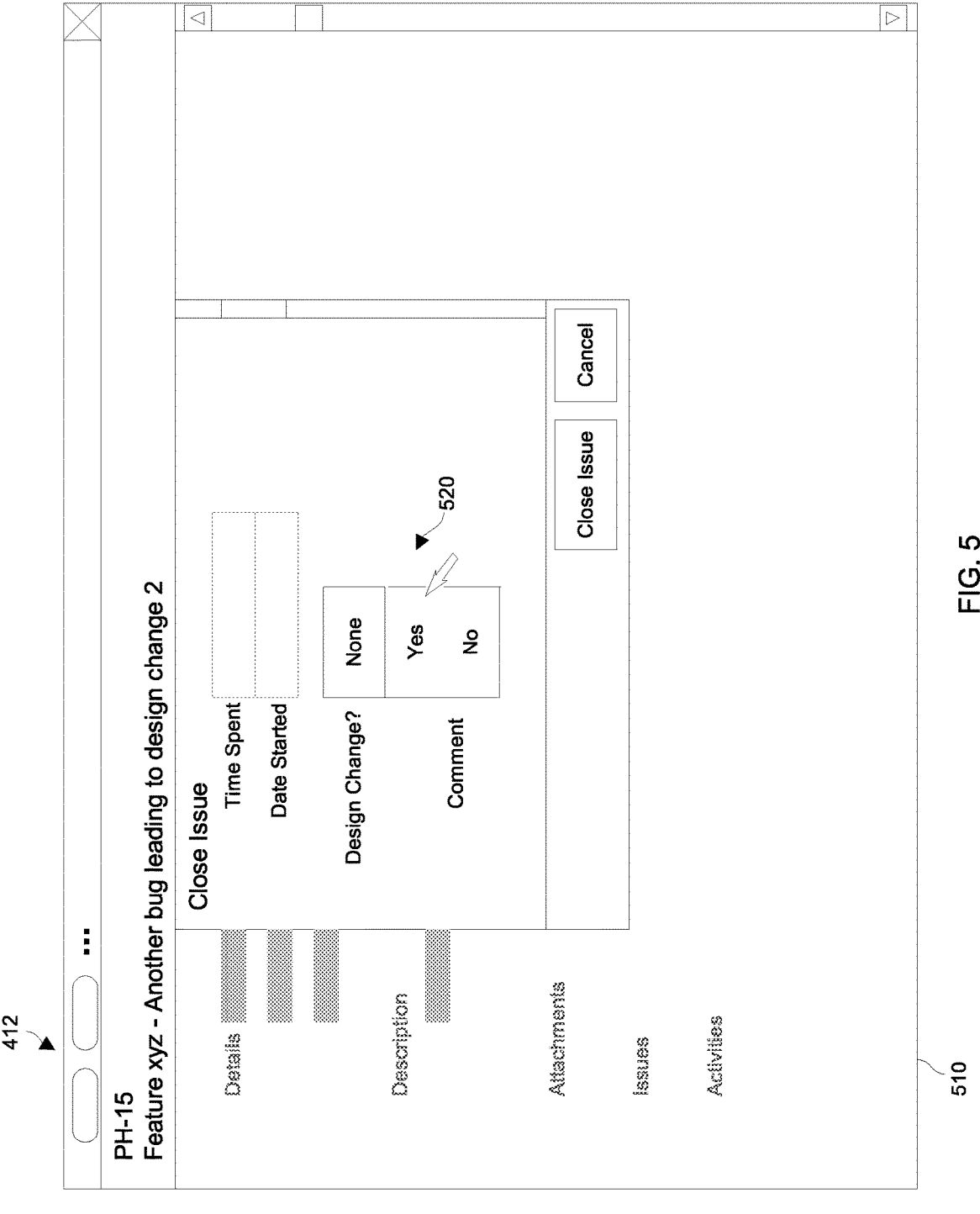
FIG. 5 is a view of an interface to an issue tracking tool at a first time in accordance with certain embodiments.
Figure 6:
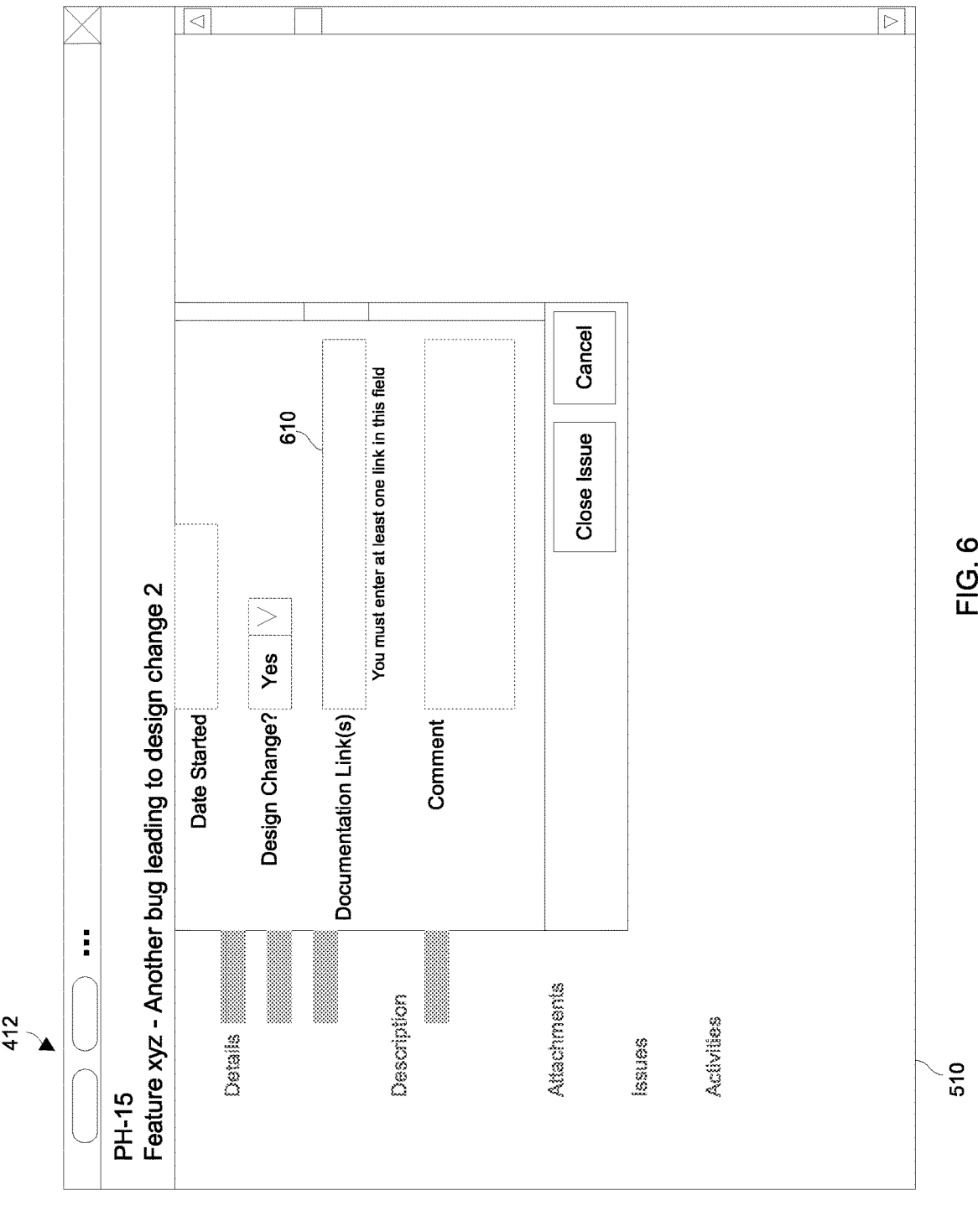
FIG. 6 is a view of the interface to the issue tracking tool at a second time that is after the first time in accordance with certain embodiments.

FIGS. 4 through 7 show certain user interfacing details in accordance with certain embodiments. FIG. 4 shows a feature dashboard which lists feature items belonging to a particular software feature. FIG. 5 shows a particular operation in which a user adds a design change tag (or marker) to an item of the software feature. FIG. 6 shows a particular operation in which the user adds a set of documentation links to the item of the software feature.

As shown in a main view 400 in FIG. 4, the feature management platform 104 (which was explained above as capable of being formed by processing circuitry running in accordance with specialized code) presents a feature dashboard (or interface) 410 to users operating respective user devices 102 (also see FIG. 1). The feature dashboard 410 may take variety of forms such as that of a set of interactive web pages on a web browser, a custom GUI, and so on.

Along these lines, the feature dashboard 410 includes a main command interface 412 into which the users are able to enter commands (e.g., by clicking on various buttons, etc.), and an area 414 which displays a variety of feature management information. For example and as shown in FIG. 4, the area 414 can present the issue tracking entries 312 of the issue tracking tool 310 as rows 420 of feature items.

For ease of explanation, this disclosure may discuss the feature management platform 104 as simply presenting the issue tracking entries 312 rather than the rows 420 of feature items (or simply feature items 420). However, it should be understood that the feature management platform 104 actually presents issue information (or feature items) from the issue tracking entries 312 rather than the issue tracking entries 312 themselves since, in accordance with certain embodiments, the issue tracking entries 312 are actually the underlying data structures holding the issue information.

As shown in FIG. 4, the rows 420 of issue tracking entries 312 include a first row 420(1) corresponding to a first issue item (or simply issue) of a particular software feature, e.g., "Feature xyz". Additionally, the rows 420 include a second row 420(2) corresponding to a second issue of the particular software feature, and so on.

Furthermore, the feature management platform 104 may selectively present certain issue information. As shown in FIG. 4 and by way of the example, the feature management platform 104 presents issue types, keys (or identifiers), and summaries in respective columns under the headings "Type", "Key", and "Summary".

As further shown in FIG. 4, the rows 420 may denote different issue types (e.g., bug, epic, story, etc.) using reference letters "B", "E", "S", etc.). Other issue types are suitable for use as well such as tasks, and so on. Additionally, the various issue types may be denoted by mechanisms other than reference letters such as by words, icons, colors, combinations thereof, etc. It should be appreciated that the particular look and feel for the rows 420 may be dictated by the particular issue tracking tool 310 in use.

Additionally, the rows 420 are arranged by key by way of example. Along these lines, the first row 420(1) corresponds with the key "PH-1", the second row 420(2) corresponds with the key "PH-2", and so on. Again, the particular details for the keys (e.g., format, how the keys are derived/created, etc.) may be dictated by the particular issue tracking tool 310 in use.

Furthermore, the rows 420 include item descriptions (under "Summary") to enable the users working on the feature management platform 104 to easily identify different issues which correspond with the rows 420. For example, the first row 420(1) relates to an issue tracking entry 312 for "Design 1", the second row 420(2) relates to an issue tracking entry 312 for "Implementation Work Item 2", and so on. Since the rows 420 receive their details from the underlying issue tracking entries 312 managed by the issue tracking tool 310, the issue description information may be obtained from the appropriate fields of the underlying issue tracking entries 312.

It should be appreciated that at least some of the rows 420 may refer to design changes (e.g., see the various item descriptions in FIG. 4). Along these lines, the descriptions of certain rows 420 may even indicate that those rows 420 refer to design changes (e.g., see the last row 420 in FIG. 4 which states "Another bug leading to design change 2").

Now, at some point, suppose that a user wishes to close out a particular issue tracking entry 312 (or row 420). Along these lines, the user may have been responsible for performing the work corresponding with the issue tracking entry 312 and, now that the user has finished the work, the user now wants to update the issue tracking entry 312 as being completed. To this end, the user navigates to a particular user input/output (I/O) area to update the issue tracking entry 312.

FIG. 5 shows a view 500 of a page 510 that corresponds to the particular feature item 420 to be closed by the user. In some arrangements, the user simply clicks on the particular feature item in the main view 400 of the feature dashboard 410 (also see FIG. 4). The feature management platform 104 senses this user input and, in response, updates the feature dashboard 410 by presenting the user with the page 510 which is specific to that feature item 420.

As shown in FIG. 5, as part of the page 510, the feature management platform 104 prompts the user for various information. During such prompting, the user indicates whether the issue which corresponds with the particular feature item 420 is a design change.

In response to the design change prompt, the user provides an answer. In some arrangements and as shown in FIG. 5, the user moves a pointer over a design change field 520 which is initially set to "None" by default and selects either "Yes" or "No". For example, the feature management tool 330 may respond to the pointer movement by rendering a drop down menu that enables the user to then select "Yes" or "No" using the pointer.

If the user selects "No" to indicate that the feature item 420 does not refer to a design change, the feature management tool 330 does not add a design change tag and instead allows the issue tracking tool 310 to proceed with closure of the issue tracking entry 312. In some arrangements, there is a feature management entry 332 for that feature item 420 but the feature management tool 330 does not add a design change tag to the respective feature management entry 332 (e.g., the feature management tool 330 leaves the design change field 344 of the respective feature management entry 332 empty or unset). In other arrangements, there is no feature management entry 332 for that feature item 420 since there is no design change (i.e., there may be an issue tracking entry 312 for the feature item 420 but the feature management tool 330 does not create a feature management entry 332).

Prior to closing out the feature item 420, the user may enter other information such as the amount of time spent, a start date, comments, and so on. Such other information is entered into various fields of the underlying issue tracking entry 312.

To close out the feature item 420, the user provides an issue closure command to the issue tracking tool 310. For example, the user may click on a "Close Issue" button. In response, the issue tracking tool 310 may record a timestamp indicating a time in which the user closed out the feature item 420 as defined by the underlying issue tracking entry 312.

If the user selects "Yes" to indicate that the feature item 420 refers to a design change, the feature management tool 330 adds a design change tag to the respective feature management entry 332. In some arrangements, the feature management tool 330 creates the feature management entry 332 (e.g., by augmenting the underlying issue tracking entry 312, by creating a full feature management entry 332, etc.) and then adds the design change tag (e.g., adds a flag, sets a Boolean, etc.). With the addition of the design change tag, the feature management tool 330 also modifies the page 510 to prompt the user for further information.

FIG. 6 shows a new view 600 of the page 510 that corresponds to the particular feature item 420 to be closed by the user. Here, the feature management tool 330 now prompts the user to enter at least one documentation link into a link field 610. Along these lines, the user may use the documentation tool 320 to navigate to an appropriate set of documents 322 (i.e., one or more documents 322), capture a set of URLs (i.e., one or more URLs) to the set of documents 322, and paste the set of URLs into the link field 610.

In some arrangements, the feature management tool 330 confirms that all of the URLs are valid (e.g., verifies that all of the URLs identify actual documents 322 in the documentation tool 320). If the feature management tool 330 detects a bad URL (i.e., a URL that does not identify a document 322), the feature management tool 330 provides an error message to the user and requires the user to correct (or delete) the URL.

Again, prior to closing out the feature item 420, the user may enter other information such as the amount of time spent on the feature item 420, a start date indicating when the user started working on the feature item 420, comments regarding the feature item 420, and so on. Then, to close out the feature item 420, the user provides an issue closure command to the issue tracking tool 310 (e.g., by clicking on a "Close Issue" button). In response, the issue tracking tool 310 records a timestamp indicating a time in which the user closed out the feature item 420. As will be explained in further detail shortly, this timestamp may be used by the feature management tool 330 to arrange (e.g., chronologically order) design changes in a feature evolution chronology.

It should be appreciated that the user may continue to enter information into the various views of the feature dashboard 410. For example, the user may update other feature items 420 (e.g., by returning to the main view 400 in FIG. 4, etc.). Such operation may continue over time along with similar participation by other users and work on the particular feature continues.

At some point, a user may want to view a design change timeline for the feature. Along these lines, that user provides a chronology generation command to the feature management tool 330 to create a feature evolution chronology. For example, the chronology generation command may be entered by clicking on a button 412 at the top of the feature dashboard 410 (also see FIG. 4). Further details will now be provided with reference to FIG. 7.

FIG. 7 is a flowchart of a procedure 700 for managing feature evolution. Such a procedure 700 is performed by specialized circuitry of the feature management platform 104 (also see FIGS. 1 through 3).

At 702, the specialized circuitry receives closure commands to close issue tracking entries in an issue tracking tool constructed and arranged to track issues for a feature. Such closure commands may be input via user interface operated by users (e.g., see FIGS. 4 through 6).

At 704, the specialized circuitry, in response to the closure commands, applies design change tags and timestamps to the issue tracking entries in the issue tracking tool. The design change tags indicate whether the issue tracking entries identify design changes in the feature, and the timestamps indicating when the design change tags are applied to the issue tracking entries. In some arrangements, the timestamps are the same closure times that the issue tracking tool uses when the issue tracking tool closes out issues in response to the closure commands.

At 706, the specialized circuitry stores, in a repository, the design change tags and the timestamps applied to the issue tracking entries to enable construction of a feature evolution chronology from the design change tags and the timestamps. Additions, the specialized circuitry requires the user to submit a set of documentation links that are also stored at this time (e.g., see FIG. 6).

Figure 8:
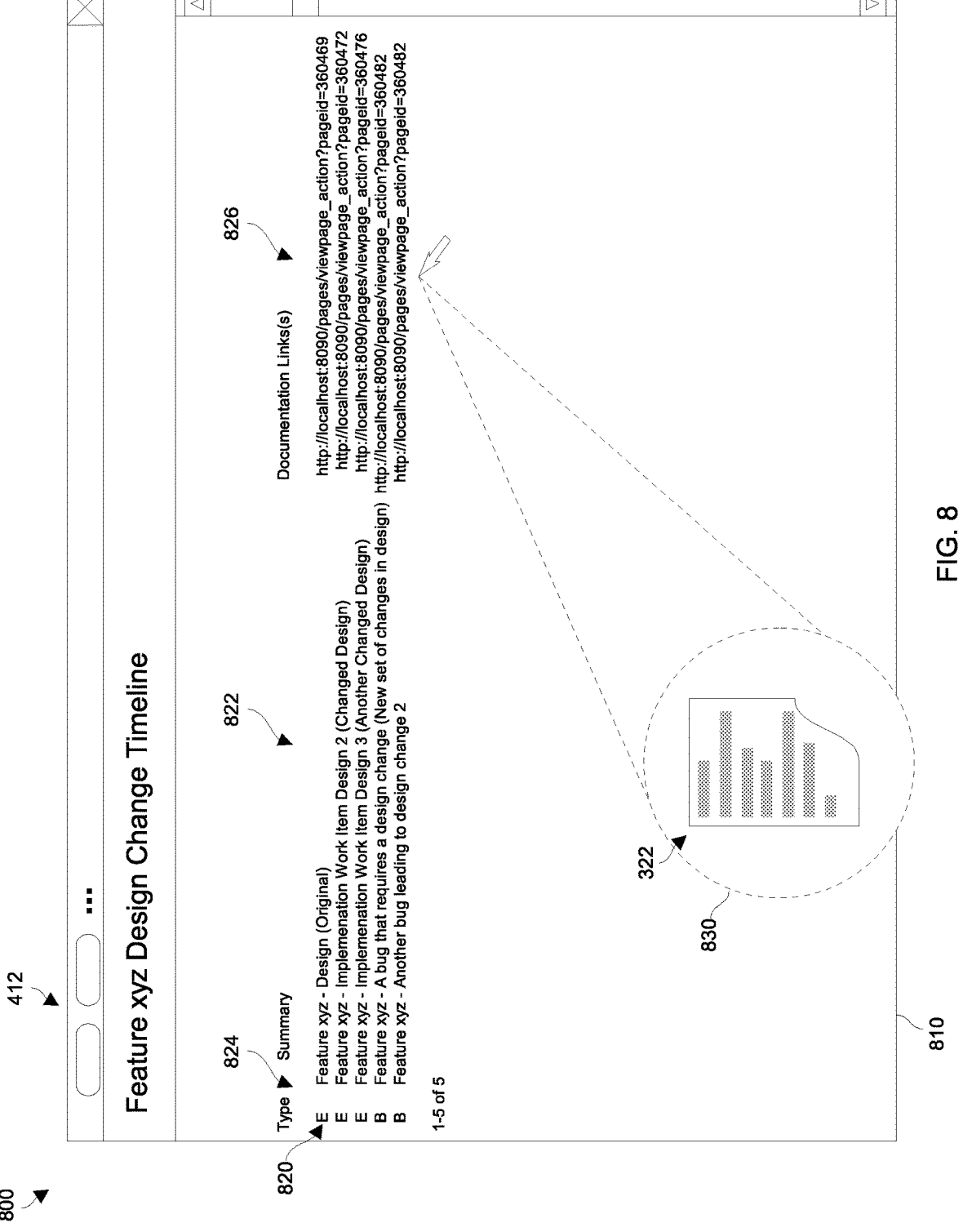
FIG. 8 is a view of a feature evolution chronology in accordance with certain embodiments.

FIG. 8 shows a view 800 of a feature evolution chronology (or timeline) 810 which is dynamically generated by the feature management tool 330. The feature evolution chronology 810 includes a listing of issues for a particular software feature. The feature evolution chronology 810 lists only the issues that were indicated to be design changes, and not issues that were not indicated to be design changes.

To generate the feature evolution chronology 810, the feature management tool 330 accesses the feature management entries 332 from the repository 334 (also see FIG. 3). In particular, the feature management tool 330 identifies issue items 820 corresponding with feature management entries 332 that refer to design changes, and then renders the issue descriptions 822 of the issue items 820 from those feature management entries 332.

By way of example, the feature management tool 330 displays the issue descriptions 822 under a "Summary" column in the feature evolution chronology 810. The feature management tool 330 also displays issue types 824 and documentation links 826.

When the feature management tool 330 generates the chronology 810, the feature management tool 330 orders the issues items 820 based on closure timestamps. Along these lines, it was explained above in connection with FIG. 6 that, when the user enters command to close feature item 420, the issue tracking tool 310 saves timestamps indicating when the feature item 420 are closed. The feature management tool 330 uses these timestamps to rank the issue items 820 based on closure time and then displays the issue items 820 in that order. Accordingly, the chronology 810 conveniently serves as a timeline of the design changes for the feature (e.g., for feature xyz).

As shown in FIG. 8, the feature management tool 330 includes the documentation links 826 next to the feature descriptions. By way of example, the documentation links 826 are displayed under the "Documentation Link(s)" column in the feature evolution chronology 810.

Recall that it was explained above that the feature management tool 330 verifies that the documentation links 826 are confirmed to be valid links when the feature item 420 are closed. Accordingly, the documentation links 826 are actual paths to documents 322 within the documentation tool 320.

In some arrangements, the feature management tool 330 renders the documentation links 826 as active links. Accordingly, when a user clicks on a documentation link 826, the feature management tool 330 automatically opens that link 826 to provide the user with access to the corresponding document 322 identified by the link 826 as illustrated by the inset 830 in FIG. 8.

In some arrangements, the feature management tool 330 auto-launches the documentation tool 320 if the documentation tool 320 is not already running and then renders the document 322. Such operation alleviates the need for the user to start (or open a new window in) the document tool 320 and then copy and paste the link 826 into the document tool 320.

It should be appreciated that, other than the feature management repository 334, the document 322 that is identified by the link 826 may have no association with the closure date of the feature item 420 defined by the underlying issue tracking entry 312 in the issue tracking tool 310. Rather, the document 322 may simply have a creation time, and perhaps access times as to when users accessed the document 322. However, when the corresponding feature item 420 is closed, the closure timestamp is saved by the issue tracking tool 310. It is the feature management tool 330 which then uses the feature management entries 332 from the repository 334 that enables documents 322 within the documentation tool 320 to be related based on closure time. Further details will now be provided with reference to FIG. 9.

Figure 9:
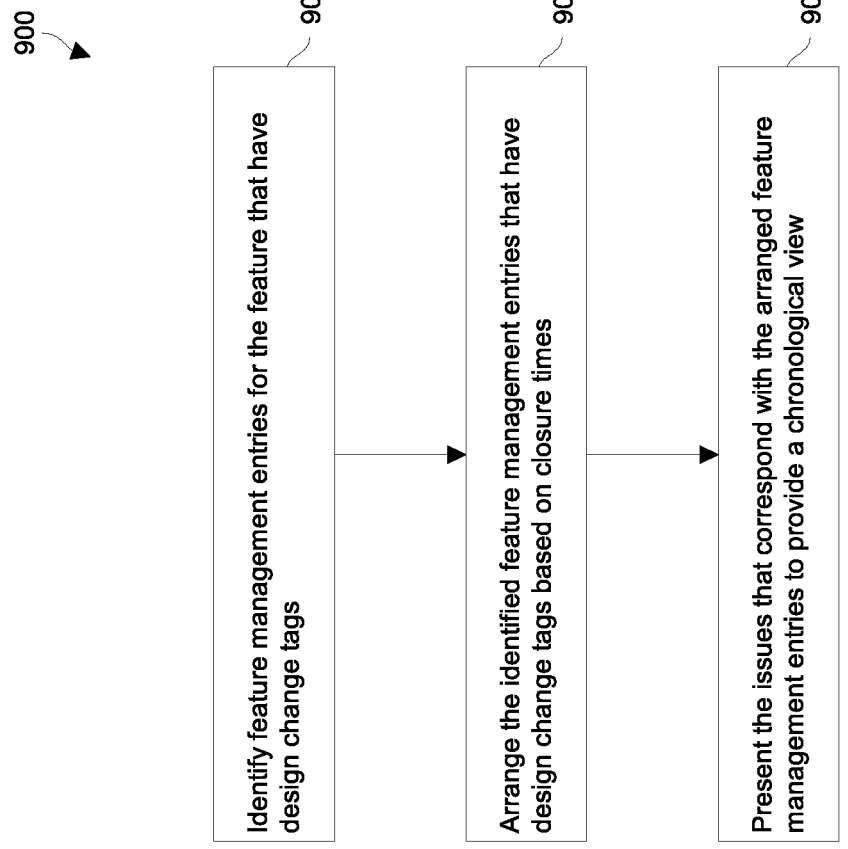
FIG. 9 is a flowchart of another procedure which is performed while managing feature evolution in accordance with certain embodiments.

FIG. 9 is a flowchart of a procedure 900 that provides a feature evolution chronology 810 (also see FIG. 8). Such a procedure 900 is performed by specialized circuitry of the feature management platform 104 (e.g., see the feature management tool 330 in FIG. 3).

At 902, the specialized circuitry identifies feature management entries for the feature that have design change tags. Recall, in connection with FIG. 3, that the contents of the design change fields of the feature management entries may be set to indicate that certain feature management entries refer to design changes.

At 904, the specialized circuitry arranges the identified feature management entries that have design change tags based on closure times. Along these lines, the specialized circuitry may order the feature management entries based on closure timestamps (which is different from ordering such entries based on key, etc.).

At 906, the specialized circuitry presents the issues that correspond with the arranged feature management entries to provide a chronological view. Along these lines, the user is able to view the issue items in a time based order and then easily access documentation for the issue items based on the links (also see FIG. 8).

As described above, improved techniques are directed to managing feature evolution using design change tags (or flags) that may be applied to issue tracking entries 312 in a feature tracking tool 310. Such tags (e.g., markers indicating that the issue tracking entries identify design changes) may be applied at the time of issue closure (e.g., the time of completion of the design changes) and may be applied along with timestamps and links to the most pertinent documentation (e.g., a set of documents 332 that was identified as being the most relevant at the time of issue closure). Moreover, such techniques enable construction of a feature evolution chronology (e.g., a design change timeline) to enable a user to easily identify particular design changes that have been completed for a feature.

In some arrangements, the feature evolution chronology 810 lists only issue tracking entries 312 that identify design changes (e.g., omitting other entries that do not identify design changes), and the issue tracking entries 312 are ordered (or organized) based on time of issue closure. In some arrangements, the links are adjacent to the issue tracking entries 312 and automatically provide access to the pertinent documentation within a documentation tool 320 to enable the user to quickly and easily navigate to that documentation. Accordingly, the user is able to effectively access pertinent documentation without needing to perform keyword searches and read through the results of the keyword searches.

One should appreciate that the above-described techniques do not merely collect and store data. Rather, the disclosed techniques involve improvements to the technology of software (e.g., feature) development. With the disclosed techniques, there are advantages such as the ability to identify issues defined by issue entries within an issue tracking tool as design changes, the ability to apply (or associate) issue closure times to documentation within a documentation tool, the ability to generate a timeline based on the issue entries within the issue tool and the documentation within the documentation tool, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the environment 100 such as the user devices 102 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

It should be appreciated that, conventionally, design changes are tracked manually by searching through documentation tools. Along these lines, current tools do not have a way to handle documentation outside the purview of bug tracker tools. For instance, conventional documentation tools cannot determine whether a particular page really corresponds to a particular feature and cannot enforce all related pages to be created under an umbrella.

It should be further appreciated that when a feature/solution is implemented, there are design decisions made as and when development is in progress. The documentation for these decisions are usually tagged to different documentation tool pages which are not interlinked. While working on large features which span months together, it becomes difficult to track these documentation tool pages and get a chronology of the decisions made and their documentation.

However, in accordance with certain embodiments disclosed herein, there are methods by which such a chronology can be achieved. Along these lines, specialized circuitry is able to maintain fields to the bug/feature tracking tool which help maintain pointers to the different documentation pages and rely on the chronology of bug/feature closures to track the chronology of changes in feature design and their corresponding documentation. This can be presented to users who want to understand the timeline of events, avoiding their effort to search for keywords in documentation and gauge the chronology themselves.

In accordance with certain embodiments, a platform utilizes a bug tracker (or issue tracking tool) and a documentation tool. When a feature is defined in the bug tracker, all the development effort and associated bug fixes are captured under a single ticket. A Boolean field is added to the bug tracker which needs to be filled mandatorily before closure of a ticket. This field determines whether there is any associated design changes as part of this the ticket. If the answer to the same is "yes", the owner (or user) of the ticket is mandated to fill in a text field which is a link to the documentation which explains this change and a short description of the change.

Once this system is in place, the database of the bug tracker becomes the source of chronology. The system can at any time present the timeline of all revisions made to the design or in general any design documentation made at any point in the development lifecycle of the feature. Once the feature is completed and if there are bugs which are identified later, which needs redesign of the feature, they also can get tagged as above and can be added to the timeline of changes made.

A stakeholder who want to know the timeline of design/architectural decisions can be presented with a dashboard for the feature which they are interested in. The timeline engine which is part of the solution, looks through the list of tracker tickets with the design change field enabled, and arranges them by their closure dates, to present the timeline. To this timeline, the short description and the documentation pages can be fitted in and the stakeholder is presented with a chronological view. The stakeholder can then follow the links to the specific design pages they are interested in, to get more details on the design decisions made.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of managing feature evolution, the method comprising:

receiving closure commands to close issue tracking entries in an issue tracking tool constructed and arranged to track issues for a feature;

in response to the closure commands, applying design change tags and timestamps to the issue tracking entries in the issue tracking tool, the design change tags indicating whether the issue tracking entries identify design changes in the feature, and the timestamps indicating when the design change tags are applied to the issue tracking entries; and storing, in a repository, the design change tags and the timestamps applied to the issue tracking entries to enable construction of a feature evolution chronology from the design change tags and the timestamps.

2. The method of claim 1, further comprising:

receiving a chronology generation request; and in response to the chronology generation request, accessing the repository to generate the feature evolution chronology based on the design change tags and the timestamps applied to the issue tracking entries.

3. The method of claim 2 wherein the issue tracking entries include design change entries and other entries;

wherein the design change tags applied to the issue tracking entries indicate that the design change entries identify design changes in the feature and that the other entries do not identify design changes in the feature; and wherein the method further comprises:

based on the design change tags, rendering a timeline which includes descriptions from the design change entries and omits descriptions from the other entries.

4. The method of claim 3 wherein the timestamps applied to the issue tracking entries in the issue tracking tool are closure times that identify when the issues for the feature were closed; and wherein rendering the timeline on the electronic monitor includes:

displaying the descriptions from the design change entries in chronological order based on the closure times that identify when the issues for the feature were closed.

5. The method of claim 1 wherein the issue tracking entries include design change entries and other entries;

wherein the design change tags applied to the issue tracking entries indicate that the design change entries identify design changes in the feature and that the other entries do not identify design changes in the feature; and wherein the method further comprises:

connecting the design change entries to documentation describing design changes in the feature.

6. The method of claim 5 wherein connecting the design change entries to the documentation includes:

receiving links to the documentation; and wherein the method further comprises:

storing, in the repository along with the design change tags and the timestamps applied to the issue tracking entries, the links to the documentation.

7. The method of claim 6, further comprising:

displaying descriptions of certain design changes identified by certain design change entries and links to certain documentation describing the certain design changes.

8. The method of claim 6 wherein the documentation resides within a documentation tool;

wherein the method further comprises:

in response to activating a link to particular documentation, providing access to the particular documentation via the documentation tool.

9. The method of claim 6 wherein receiving the links to the documentation includes:

during closure of an issue tracking entry, detecting a broken link that does not identify documentation, outputting an alert indicating that the broken link does not identify documentation, and prompting, in place of the broken link, for input of a proper link that identifies documentation before allowing a user to close the issue tracking entry.

10. Electronic equipment, comprising:

memory; and control circuitry coupled to the memory, the memory storing instructions which, when carried out by the control circuitry, cause the control circuitry to perform a method of:

receiving closure commands to close issue tracking entries in an issue tracking tool constructed and arranged to track issues for a feature, in response to the closure commands, applying design change tags and timestamps to the issue tracking entries in the issue tracking tool, the design change tags indicating whether the issue tracking entries identify design changes in the feature, and the timestamps indicating when the design change tags are applied to the issue tracking entries, and storing, in a repository, the design change tags and the timestamps applied to the issue tracking entries to enable construction of a feature evolution chronology from the design change tags and the timestamps.

11. Electronic equipment as in claim 10, further comprising:

receiving a chronology generation request; and in response to the chronology generation request, accessing the repository to generate the feature evolution chronology based on the design change tags and the timestamps applied to the issue tracking entries.

12. Electronic equipment as in claim 11 wherein the issue tracking entries include design change entries and other entries;

wherein the design change tags applied to the issue tracking entries indicate that the design change entries identify design changes in the feature and that the other entries do not identify design changes in the feature; and wherein the method further comprises:

based on the design change tags, rendering a timeline which includes descriptions from the design change entries and omits descriptions from the other entries.

13. Electronic equipment as in claim 12 wherein the timestamps applied to the issue tracking entries in the issue tracking tool are closure times that identify when the issues for the feature were closed; and wherein rendering the timeline on the electronic monitor includes:

displaying the descriptions from the design change entries in chronological order based on the closure times that identify when the issues for the feature were closed.

14. Electronic equipment as in claim 10 wherein the issue tracking entries include design change entries and other entries;

wherein the design change tags applied to the issue tracking entries indicate that the design change entries identify design changes in the feature and that the other entries do not identify design changes in the feature; and wherein the method further comprises:

connecting the design change entries to documentation describing design changes in the feature.

15. Electronic equipment as in claim 14 wherein connecting the design change entries to the documentation includes:

receiving links to the documentation; and wherein the method further comprises:

storing, in the repository along with the design change tags and the timestamps applied to the issue tracking entries, the links to the documentation.

16. Electronic equipment as in claim 15, further comprising:

displaying descriptions of certain design changes identified by certain design change entries and links to certain documentation describing the certain design changes.

17. Electronic equipment as in claim 15 wherein the documentation resides within a documentation tool;

wherein the method further comprises:

in response to activating a link to particular documentation, providing access to the particular documentation via the documentation tool.

18. Electronic equipment as in claim 15 wherein receiving the links to the documentation includes:

during closure of an issue tracking entry, detecting a broken link that does not identify documentation, outputting an alert indicating that the broken link does not identify documentation, and prompting, in place of the broken link, for input of a proper link that identifies documentation before allowing a user to close the issue tracking entry.

19. A computer program product having a non-transitory computer readable medium which stores a set of instructions to manage software feature evolution; the set of instructions, when carried out by computerized circuitry, causing the computerized circuitry to perform a method of:

receiving closure commands to close issue tracking entries in an issue tracking tool constructed and arranged to track issues for a software feature;

in response to the closure commands, applying design change tags and timestamps to the issue tracking entries in the issue tracking tool, the design change tags indicating whether the issue tracking entries identify design changes in the software feature, and the timestamps indicating when the design change tags are applied to the issue tracking entries; and storing, in a repository, the design change tags and the timestamps applied to the issue tracking entries to enable construction of a software feature evolution chronology from the design change tags and the time-stamps.

* * * * *